Patented Mar. 17, 1936

2,033,977

UNITED STATES PATENT OFFICE 2,033,977

TREATMENT OF FILAMENTS, FABRICS, AND THE LIKE

Henry Dreyfus, London, England

No Drawing. Application August 11, 1932, Serial No. 628,367. In Great Britain September 14, 1931

2 Claims. (Cl. 28—1)

This invention relates to the treatment of filaments, threads, yarns, ribbons, films, fabrics and other materials, particularly materials which are of artificial origin, and especially those made of or containing cellulose acetate or other organic derivatives of cellulose.

The invention relates primarily to processes for securing the delustring of artificial materials of the above character by interaction upon the materials of two or more reagents. A number of processes are already known for producing such artificial materials having a reduced, subdued or modified lustre. In some of these processes the final delustring agent is produced by interaction of two or more reagents upon the material, but in most cases the delustring is achieved by incorporating pigment-like substances in the spinning solution used for the manufacture of the materials.

According to the present invention, in the delustring of filaments, threads, yarns, ribbons, films, fabrics and other materials, and especially those of artificial origin, by the interaction of two or more reagents upon the material, the second reagent is applied under such conditions as to inhibit altogether or at least restrain the solution of the first reagent from the fibre or material. Preferably the first reagent is applied under such conditions that it does not dissolve completely in the substance of the filaments or other materials, but is retained largely upon the surface of the materials, or is only slightly absorbed in the material.

In order to achieve the first of these desiderata any suitable means may be adopted. Bath treatments with the second reagent are in general unsuitable in that they tend to dissolve off from the material the first reagent. However, bath treatments may be applied provided that suitable measures are adopted to prevent or at least restrain such solution. For example the second reagent may be applied in a medium in which the first reagent is insoluble or substantially insoluble, as for example by employing an alcoholic or aqueous alcoholic or other organic or aqueous organic medium in which the first reagent is substantially insoluble. A further means of securing the desired result is to dissolve in the bath in which the second reagent is applied a substance or substances which will diminish the solubility of the first reagent in the medium employed, and for this purpose common salt or potassium chloride in high concentration is a very suitable substance indeed. Not only may the salt or like substance restrain solution of the first reagent in the medium in which the second reagent is applied, but in addition it may promote the separation of the final delustring compound upon the material.

In choosing reagents adapted to diminish the solubility of the first reagent in the medium in which the second reagent is applied, regard may be had to the effect of using in the medium of the second reagent the same ion as that present on the fibre in the form of the first reagent. For example, if the first reagent be a soluble metallic chloride it is very advantageous indeed to employ sodium chloride or other chloride in concentrated solution together with the second reagent, by which means solution of the barium or other metallic chloride already on the fibre is restrained to a large extent.

A further and very important means for applying the second reagent under such conditions that solution of the first reagent is altogether inhibited consists in applying the second reagent in gaseous or vapour form, and for this purpose carbon dioxide and ammonia gas and other volatile bases are of especial value. Thus, for instance, if the first reagent applied to the material be a salt of an alkaline earth metal or of aluminium, zinc or lead, carbon dioxide may be employed to precipitate it upon the material and produce the desired delustring. Similarly, ammonia is also very valuable for each of these reagents.

A further means for preventing or restraining solution of the first reagent when applying the second reagent consists in applying the second reagent in only a limited quantity of a suitable solvent. Thus for example the second reagent may be applied in paste or thickened form and may be printed uniformly over the whole material, or may be printed or stencilled locally so as to produce local delustred effects upon a lustrous ground. Such treatments are of course particularly suitable for fabrics. A further means consists in spraying a solution of the second reagent on to the material already impregnated with the first reagent, such spraying being either uniform or local. The second reagent may further be applied by padding methods, as for instance on the usual padding mangles. This method is especially efficacious where padding solutions containing a considerable quantity of thickening agent are employed.

The delustring compounds to be formed upon the material in accordance with the present invention may be any suitable compounds which are sufficiently insoluble in water or in aqueous reagents with which the materials are customarily treated in commercial practice. Inasmuch as it is desirable that the materials delustred in accordance with the present invention shall be capable of being dyed or otherwise coloured in any desired colours, it is preferable that the compounds formed on the materials in accordance with the invention should be white or substantially white. The compounds of calcium, barium, strontium, magnesium, aluminium, zinc and lead are of greatest importance. Thus, for example, the final delustring compounds precipitated upon the materials may be the sulphates, carbonates, phosphates, hydroxides or basic salts of these metals. Equally or even more important, however, are the insoluble or difficultly soluble organic acid salts of the above metals, for example the salts of the di- or poly-basic carboxylic acids or di- or poly-basic hydroxy carboxylic acids, for instance oxalic acid, tartaric acid, citric acid, mucic acid or saccharic acid, and also of the higher fatty acids, as for example oleic, stearic, palmitic, ricinoleic and lauric acids.

As has been indicated the most important delustring agents for application in accordance with the present invention comprise insoluble metallic compounds. In order to produce these compounds upon the materials either the metal or the acid or other radicle may be applied first. I find it preferable to apply the metallic radicle first and for this purpose the first reagent may be constituted by any suitable soluble compound of the metal, as for example the chlorides, nitrates and acetates of any of the metals mentioned above. Similarly the acid radicle for producing the precipitation of the metal may be applied in any suitable form, as for example in the form of a soluble salt of the acid, or in the form of the free acid.

It has been found that artificial materials delustred in accordance with previously known processes present the disadvantage that when the materials are subsequently dyed black or dyed in dark shades, for example dark blues, the effect of the delustring disappears and the fabric, filament, yarn or other material appears lustrous again. This remarkable phenomenon is also observable on dyeing in dark shades cellulose acetate material which has been delustred by treating with hot or boiling aqueous soap solutions. Notable among the advantages of the present invention is that the delustred material retains its low lustre, or is only slightly relustred upon colouration with black or dark coloured dyestuffs.

An important consideration for securing this advantage to the highest degree consists in applying the first reagent under such condition that it does not penetrate the core of the material under treatment, or at least a considerable excess thereof is allowed to remain upon or near the surface of the materials at the time of reaction with the second reagent. In order to achieve this result it is desirable to employ reagents which do not themselves under the conditions of treatment swell the substance of the filaments, fabrics, etc., and moreover the presence of swelling agents during their application is preferably avoided.

To ensure that an adequate amount of the reagent is retained by the filaments, fabrics or other products, it is preferable that the material should be impregnated with a solution of the reagent and the solvent in such solution removed so as to leave a considerable proportion of the reagent upon the materials. The fabric or other material after impregnation with the solution of the reagent may, for example, be subjected to a preliminary hydroextraction and then subjected to drying so as to evaporate part or all of the water. A complete drying is in some cases undesirable inasmuch as the fabric having the first reagent dried thereon is sometimes in unsuitable condition for reaction with the second reagent, and in such a case it is preferable to retain a certain proportion of water so as to facilitate wetting of the fabric on treatment with the second reagent. Drying under vacuum or reduced pressure and by gentle warming is the best method of concentrating the first reagent upon the materials. The fabric impregnated with a solution of the first reagent may, for example, be passed slowly over a series of heated perforated drums connected to a pump or other suction apparatus.

By carrying out delustring as described above, and especially under conditions which do not bring about solution of the reagents in the substance of the materials, i. e. under conditions in which swelling of the material is substantially avoided, it is found that the delustring of the material is such that upon subsequent colouring of the material in black or dark shades the low lustre of the materials is substantially retained.

The invention is of greatest value in the treatment of materials made of or containing cellulose acetate or other organic derivatives of cellulose, for example cellulose formate, cellulose propionate, cellulose butyrate, cellulose nitro-acetate and other organic esters and mixed esters of cellulose, and cellulose ethers, for instance ethyl, propyl and benzyl cellulose, mixed ethers e. g. ethyl-benzyl cellulose, and mixed ether-esters. This is primarily due to the fact that it is relatively easy to apply reagents to such materials without swelling the material. However, the invention is also of value in the treatment of natural silk goods, the lustre of which is somewhat high for some purposes, and also in the treatment of viscose, cuprammonium and nitro-cellulose artificial silks.

The following examples are given to illustrate the invention, but it is to be understood that they do not limit it in any way:—

*Example 1*

A cellulose acetate yarn is worked for ½ hour in a bath containing 60 gms. per litre of $BaCl_2$ at a temperature of about 60° C. It is then removed, centrifuged, and treated in a bath containing disodium hydrogen phosphate and potassium chloride until a sufficient degree of delustring is obtained, after which it is washed and dried.

*Example 2*

A cellulose acetate yarn is worked for from ½–1½ hours in a saturated solution of barium hydroxide at from 50°–70° C. and is then centrifuged and treated in an alcoholic solution of oxalic acid. A delustred yarn is thus obtained.

*Example 3*

A cellulose acetate woven fabric which has been treated with a fairly concentrated solution of sodium aluminate and centrifuged but not dried, is stretched out or hung in a suitable chamber and exposed at from 50°–70° C. to the vapours of moist carbon dioxide. The material is then washed to remove the sodium carbonate formed.

and a delustred fabric containing aluminium-hydroxide is obtained.

What I claim and desire to secure by Letters Patent is:—

1. Process for modifying the lustre of filaments, threads, films, fabrics and like materials of organic derivatives of cellulose, said process comprising treating such material, containing barium chloride, in a bath containing an alkali phosphate and a high concentration of alkali chloride.

2. Process for modifying the lustre of filaments, threads, films, fabrics and like materials containing organic derivatives of cellulose, which comprises applying barium chloride to the materials under such conditions that it is retained largely in the surface thereof, and treating the materials with a bath containing an alkali phosphate and a high concentration of alkali chloride.

HENRY DREYFUS.